Nov. 23, 1965 — JAMES E. WEBB — 3,219,849
ADMINISTRATOR OF THE NATIONAL AERONAUTICS
AND SPACE ADMINISTRATION
FISSION ELECTRIC GENERATOR

Filed June 20, 1962 — 2 Sheets-Sheet 1

INVENTOR.
WALTER F. KRIEVE
BY
ATTORNEYS

Nov. 23, 1965

JAMES E. WEBB
ADMINISTRATOR OF THE NATIONAL AERONAUTICS
AND SPACE ADMINISTRATION
FISSION ELECTRIC GENERATOR 3,219,849

Filed June 20, 1962

INVENTOR.
WALTER F. KRIEVE
BY
ATTORNEYS

United States Patent Office 3,219,849
Patented Nov. 23, 1965

1

3,219,849
FISSION ELECTRIC GENERATOR
James E. Webb, Administrator of the National Aeronautics and Space Administration, with respect to an invention of Walter F. Krieve
Filed June 20, 1962, Ser. No. 204,016
15 Claims. (Cl. 310—3)

This invention relates to fission electric generators; that is, to generators which convert energy emitted by fissionable material directly into electrical energy.

A typical fission electric cell employed in a fission electric generator comprises a central cathode consisting of enriched uranium oxide in the form of a coating on, for example an aluminum support surrounded by an anode and an enclosing envelope. The fission electric cell is placed adjacent to the fuel rods of a nuclear reactor so that a high intensity neutron flux passes through the fission electric cell. When a neutron strikes a fissionable uranium atom on the cathode, the uranium atom splits and two particles fly out, each particle having a positive charge. On the average, one of the particles remains on the cathode, but the other particle flies out of the uranium oxide coating and hits the anode where it is captured. The movement of positive particles from the cathode to the anode increases the potential of the anode. The fission electric cell then acts as an electrical source so that, if an electric circuit is connected between the cathode and anode of the cell, current will flow through the wire or circuit from the anode to the cathode.

There are problems associated with the typical fission electric cell described above, due to electrons, which are negative particles, flowing from the cathode to the anode, which reduce or overcome the particle-caused current. The flow of electrons to the anode comes about through two phenomena:

First, the particles resulting from the splitting or fissioning of the uranium atoms go through three stages of beta decay in which electrons are emitted. The electrons emitted by decaying particles captured by the anode are absorbed by the anode and cause no effect. However, many of the electrons emitted by decaying particles on the cathode hit the anode and are absorbed by it, to effectively decrease the current output of the cell.

Second, the nuclear reactor also generates a high intensity beam of gamma rays. When gamma rays strike a material, they cause the emission of electrons in what is called the Compton effect or Compton scattering. When gamma rays strike the cathode, a large number of the emitted electrons travel from the cathode to the anode, where they are captured and reduce the particle-caused current or forward current. The deleterious effects of gamma rays may be reduced by surrounding the fission electric cell with a wall of bismuth which greatly reduces gamma ray beam intensity. However, the bismuth wall also reduces neutron flux density to some extent, in addition to adding substantial weight to the electric cell and greatly increasing its cost.

A primary object of this invention is to provide a fission electric generator wherein the normally undesirable characteristics of beta decay and Compton effect are caused to increase, rather than decrease, the flow of current from the cathode to the anode of the cell; this being accomplished by utilizing a uniquely arranged anode having relatively thin walls and an enclosing envelope, which is maintained at essentially the same potential as the cathode.

A further object is to provide a fission electric generator wherein, by utilizing an anode having a predetermined thickness, the net current contribution by beta decay and Compton scattering may be cancelled so as to have essentially zero effect; thereby adapting the cell to the study of positive particle-caused currents alone and to the observation of changes in particle-caused currents, due to varying geometry and operating conditions of the generator cell, without the need of compensating for changes in beta decay and Compton scattering current.

A still further object is to provide a fission electric generator which may be arranged to have high-voltage, low-current output by maintaining a vacuum in the region between the anode and cathode, or is arranged to have a higher current and lower voltage output by maintaining an inert gas in the region between the anode and cathode.

A further object is to provide a fission electric generator which includes a generator cell that may receive its energy from placement adjacent a fission reactor; the generator cell being adapted, however, for arrangement in clusters in such a manner that the aggregate quantity of the fissionable material contained in the clusters of cells may exceed a critical value at which the cells themselves emit sufficient neutrons to function as an atomic energy source, independent of an external source.

A further object is to provide a fiission electric cell which has a novelly arranged cathode incorporating collimator rings which minimize axial escape of fission particles, and which also forms zero field regions on the axial sides of said rings that minimize emission of electrons which might strike the anode.

A further object is to provide a fission electric cell which incorporates an anode having a honeycomb or pocketed internal surface, forming essentially zero field regions wherein any secondary or positive ions created on the anode have a statistically feasible chance of combining with a free electron.

With the above and other objects in view, as may appear hereinafter, reference is directed to the accompanying drawings in which.

Figure 1:
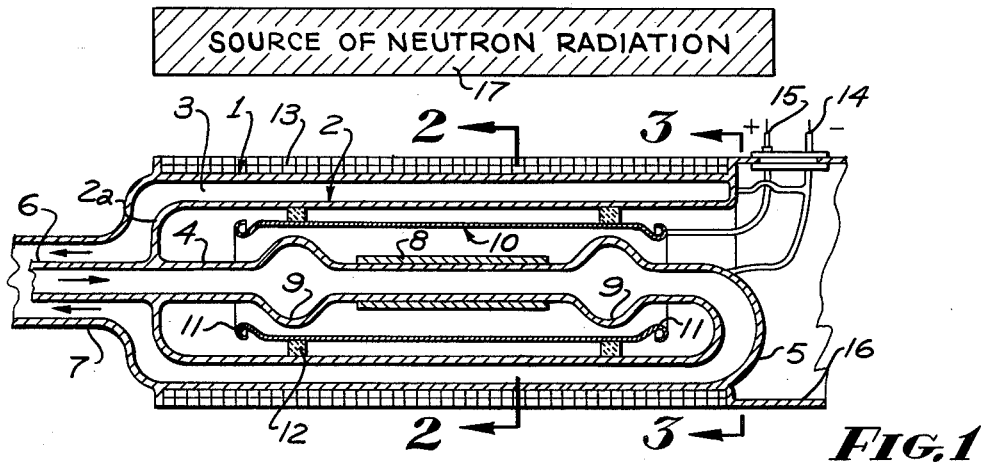
FIGURE 1 is a substantially diagrammatical, longitudinal, sectional view, showing one form of a generator cell used in the fission electric generator.
Figure 2:
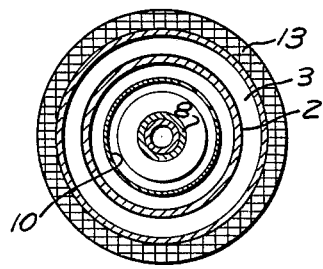
FIGURE 2 is a transverse, sectional view taken through 2—2 of FIGURE 1.
Figure 3:
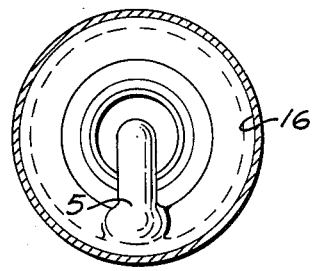
FIGURE 3 is a transverse, sectional view taken through 3—3 of FIGURE 1.

Reference is first directed to FIGURES 1, 2, and 3 which illustrate one form of a fission electric cell used in the fission electric generator. The fission electric cell includes an outer shell or jacket 1, which is shown as cylindrical in form. A cylindrical inner shell or envelope 2 is disposed concentrically within the outer shell 1, and is joined thereto at one end to form an annular coolant chamber 3.

A central tube 4 is disposed concentrically within the inner shell 2. One end 2a of the inner shell is inturned or closed and joined to the central tube 4. The other extremity of the central tube is joined by a U-tube 5 to the annular coolant chamber 3. The central tube 4 continues from the inner shell 2 to form a coolant inlet 6. The corresponding end of the outer shell 1 is constricted to form a coolant outlet 7 concentric with the central tube 4.

The mid-portion of the central tube 4 is coated with a fissionable material forming a cathode 8. Various fissionable materials may be used, for example, enriched uranium oxide (uranium oxide containing a large portion of the isotope $U^{235}$) or plutonium containing a large portion of the isotope $P^{239}$.

The central tube 4 is provided with enlargements 9 or emission blocking structure at each axial end of the cathode 8. These enlargements serve to block electrons which would escape axially, hit the outer shell 2, and cause the secondary emission of electrons.

Interposed between the central tube 4 and inner shell or envelope 2 is an anode 10 in the form of a cylinder, having reduced ends 11 which are outwardly curled at their extremities. The reduced ends 11 are located beyond the enlargements 9, and are so dimensioned that any emission from the cathode 8 which clears the enlargements 9 will strike the anode 10. The anode is supported concentrically within the envelope 2 by spacers 12 formed of insulating material, such as quartz.

The outer shell 1 is surrounded by a coil 13 for the purpose of establishing an electromagnetic field within the fission electric cell.

A conductor 14 is electrically connected to the central tube 4 and to the shells 1 and 2. This forms the negative lead from the fission electric cell. A second conductor 15 is electrically connected to the anode 10 and forms the positive lead from the fission electric cell.

The end of the fission electric cell, opposite from the coolant inlet 6 and coolant outlet 7, is provided with a tubular extension 16 which communicates with a means (not shown) for producing a high vacuum so that the annular space between the inner shell 2 and central tube 4 is maintained under a condition of high vacuum.

It is essential to the operation of the fission electric generator that the cell be exposed to neutron bombardment. This may be accomplished by placing the cell in the vicinity of an atomic reactor 17, indicated diagrammatically in FIGURE 1, or it may be accomplished, as will be brought out hereinafter, by grouping a number of cells into a cluster containing a critical quantity of fissionable material.

The outer shell 1, inner shell 2, and central tube 4 are formed of metal through which neutrons may pass. Most metals meet this requirement to a greater or lesser degree.

The construction of the anode plays a crucial part in the function of the fission electric cell. It is essential that it be formed of a metal having a sufficient thickness that it will capture particles or fragments resulting from the impact of neutrons on fissionable uranium atoms, and it is desirable that it also be thick enough to capture gamma rays. On the other hand, it is essential that the anode be, in effect, transparent to high energy electrons created in beta decay and Compton scattering. These requirements are adverse to each other. But it has been found that if the anode is, for example, formed of a heavy metal, such as platinum, a wall thickness of approximately .0010" will result in an optimum condition wherein the positive fission particles are captured in sufficient quantity for efficient operation of the cell; yet high energy electrons pass through the anode. For lighter metals the optimum thickness is greater: for example, for nickel the optimum thickness is about .002". For most metals the optimum thickness ranges from about .001" to about .005". It has been found, also, that the desirable effect of increased electrical output, when the anode is made thin, begins to be apparent if the wall thickness is under .030" and is greater than .0005".

While platinum is cited as an example, it should be understood that any other nonmagnetic metal may be used. For example, tungsten and aluminum, to indicate widely divergent metals, may be used. The optimum wall thickness of the anode in each case increases as the density of the metal decreases; that is, a greater wall thickness is permissible with aluminum than is permissible with tungsten or platinum.

It should be noted that a great deal of heat is created in the fissioning and beta decays. While the central tube 4 is water cooled, the insulated anode 10 must cool primarily by thermal radiation. Accordingly, for many operating levels, the anode should be made of a heat-resisting material, such as platinum, tungsten, or nickel.

Operation of the fission electric generator cell shown in FIGURES 1, 2, and 3 is as follows:

The interior of the fission cell is maintained under conditions of high vacuum. A coolant is circulated through the chamber 3 and within the central tube 4. The coolant may be water. The cell is located near a high intensity neutron flux, such as that which exists near the fuel cells of a nuclear reactor.

When a neutron passes through the cell, strikes the cathode 8, and hits a fissionable atom of the fissionable material comprising the cathode, for example, an atom of Uranium 235, if enriched uranium oxide is used, the atom fissions and splits into two relatively heavy particles having atomic weights of 95 and 140. These particles fly off in substantially opposite directions. Each particle carries a positive charge of twenty to twenty-two times that of an electron charge.

Statistically, one particle will move deeper into the cathode 8 and be captured therein. The other particle leaves the cathode 8 and flies into the anode 10 where it is captured. The movement of positive particles from the cathode 8 to the anode 10 increases the potential at the anode, and an output current becomes available at the conductors 14 and 15.

The fission particle now embedded in the anode 10 undergoes beta decay, causing the liberation of high energy electrons. These high energy electrons, which have a negative charge, pass through the walls of the anode and fly either to the cathode 8 or the envelope 2. In either case they are stopped, and algebraically add their negative potential to the potential established between the conductors 14 and 15. The thinner the anode wall the greater will be the number of electrons which can pass through and leave the anode. Conversely, the anode must not be too thin so that it fails to capture a substantial percentage of the positively charged particles resulting from fission.

With regard to the beta decay of particles within the cathode 8, the electrons liberated therefrom are largely absorbed by the cathode or fly through the anode 10 and are captured by the envelope 2. In either case, they contribute no effect to the generated potential.

With regard to gamma rays, those rays which strike the anode 10 produce high energy electrons which are not absorbed by the anode but fly therefrom to the cathode 8 or envelope 2. These electrons, when caught, add their potential to the output from the cell. Those gamma rays which strike the cathode 8 or the envelope 2 and produce electrons have little or no effect on the output from the cell, as the resulting lower energy electrons are recaptured by the cathode 8 or envelope 2, as will be more fully described hereinafter, and most of the high energy electron pass through the thin wall anode.

Still other phenomena occur. When a neutron hits a fissionable uranium atom, not only do two heavy particles fly off, but low energy electrons are also produced which are drawn from the cathode 8 with the fission particles which leave the cathode. Normally, many of these low energy electrons would impinge on the anode 10. If the electrons are captured by the anode, then the negative potential of the captured electrons subtract from the net output of the cell.

The electromagnetic or solenoid coil 13 produces a magnetic field which is axial, or essentially parallel, to the surface of the cathode 8. Low energy electrons which leave the cathode, having a component velocity at right angles to the magnetic field and carrying an electric charge, are therefore deflected by the magnetic field so that they return to the cathode 8. Similarly, many low energy electrons which are liberated by Compton scattering and would therefore normally be captured by even a thin anode, are returned to the cathode 8. Thus electrons having an energy value below a threshold value determined by the magnetic field and geometry of the cell are returned to the surface from which they leave; whereas, the electrons having an energy value above this threshold escape, but having a high energy level, pass through the anode 10. Thus, in either case, the great majority of these electrons have no effect to increase or decrease the output current from the cell.

Figure 4:
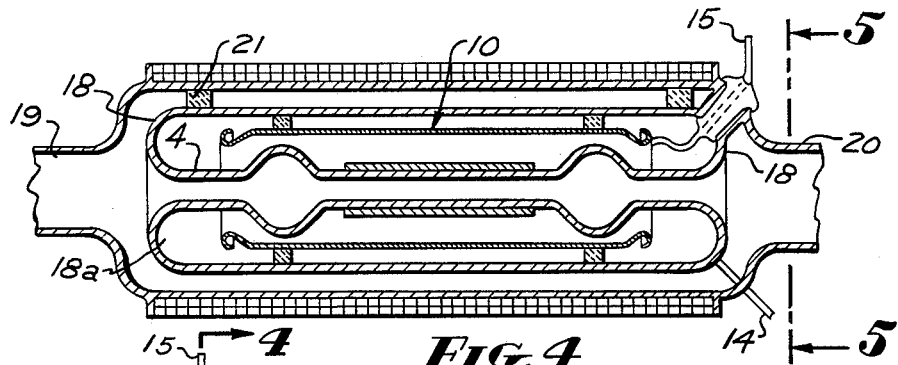
FIGURE 4 is a substantially diagrammatical, longitudinal, sectional view, showing a modified form of a generator cell used in the fission electric generator taken through 4—4 of FIGURE 5.
Figure 5:
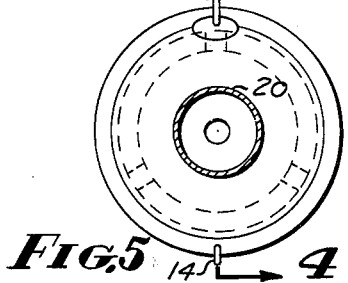
FIGURE 5 is a transverse, sectional view taken from 5—5 of FIGURE 4.

Reference is now directed to FIGURES 4 and 5. The construction here illustrated differs from the previously described structure in that the central tube 4 is joined by end walls 18 to both ends of the inner shell or envelope 2 to form a closed chamber 18a.

The chamber 18a contains a gas existing in an atomic state, such as helium. The introduction of gas results in an electric cell of higher curent at the expense of lower voltage. When a neutron hits a fissionable uranium atom on the cathode 8 and a positive fission particle starts flying toward the anode 10 through the helium gas, the particle ionizes helium gas atoms. The positive helium atoms are also pushed towards the anode 10 as the fission particles pass by, and many of the helium ions reach the anode. The flow of positive helium ions to the anode 10 adds to the flow of positive particles to the anode, and results in a large current flow.

The outer shell 1 in this case is constricted at both ends to provide an inlet 19 at one end and an outlet 20 at the other end. Spacers 21 center the envelope 2 within the outer shell 1.

During the ionizations of helium atoms, free electrons are created, and they are shot in all directions. Many electrons hit the anode 10 and create a negative current, but their effect is largely canceled when other electrons hit the cathode 8. Many other electrons created during ionizations are spun in circles by the magnetic field created by the solenoid coil 13, and migrate towards the end walls 18 where they add to the forward current of the cell.

Various gases can be used besides helium, but a gas existing in an atomic state should be used for maximum efficiency. If a gas existing in a molecular state such as $O_2$ were used, part of the energy of the fission particles would be used in splitting the molecules of the gas into atoms and less electricity could be obtained.

Helium is a light gas, and its use results in a lower voltage, higher current cell than does the use of a heavier gas. The lower the weight of a gas atom, the less kinetic energy is transferred to it when it is hit by a fission particle from the cathode 8. Since the helium atoms receive a lower kinetic energy than heavier atoms (but the same + charge), the helium atoms have less energy to overcome the repelling force of the positive anode 10, and only a smaller positive voltage can be maintained on the anode. However, the fact that the fission particles lose less energy to each helium atom means that they can ionize more helium atoms before their energy is spent. For maximum current, a sufficiently high gas pressure is maintained to assure that the average fission particle delivers most of its energy to helium atoms before it reaches the anode. For a higher voltage cell, heavier noble gases such as neon, argon, and krypton can be used.

The arrangement shown in FIGURE 1 has an output of high potential and relatively low current, whereas the output of the shell shown in FIGURE 4 has a relatively low potential and a relatively higher current output.

Figure 6:
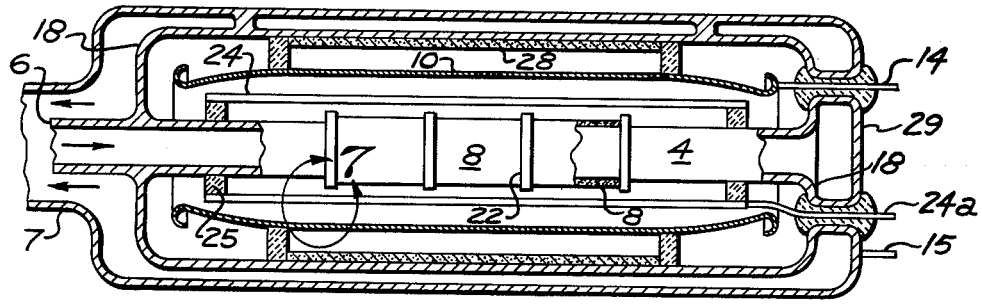
FIGURE 6 is a substantially diagrammatical, longitudinal, sectional view, showing a still further modified form of a generator cell used in the fission electric generator.
Figure 7:
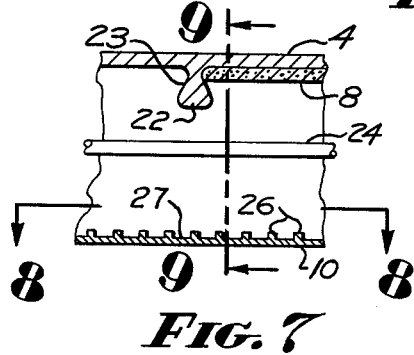
FIGURE 7 is an enlarged, fragmentary, sectional view taken within circle 7 of FIGURE 6.
Figure 8:
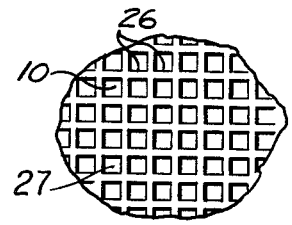
FIGURE 8 is an enlarged, fragmentary, developed view, showing the internal surface of the anode, the view being taken from 8—8 of FIGURE 7.
Figure 9:
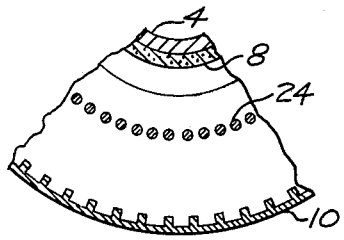
FIGURE 9 is an enlarged, fragmentary, sectional view taken through 9—9 of FIGURE 7.

Reference is now directed to FIGURES 6 and 9. In this construction, the central tube 4 is provided with several axially spaced end emission block rings 22 which perform the same function as the enlargements 9. These rings divide the cathode 8 into several segments. As shown in FIGURE 7, the rings 22 have undercut sides 23 which produce, adjacent these sides, zones having essentially zero electric fields. Some positive particles fly near the rings 22 as they travel toward the anode 10. These particles drag out electrons from the rings, but the existence of a zero field reduces the number of electrons which leave.

Interposed between the cathode 8 and the anode 10 is an electrostatic grid 24 in the form of a perforated cylinder. For example, the grid may be formed of spaced, parallel wires as shown in FIGURE 9. The grid is supported at its axial ends by rings 25 of insulating material, for example, quartz. The grid 24, is charged to a negative potential by an electrical source connected to it through the wire 24a.

The electrostatic grid 24 performs the same function as the electromagnet or solenoid 13 in that the grid is maintained at a negative potential so as to return to the cathode 8 electrons having an energy value below a predetermined threshold.

The internal surface of the anode 10 shown in FIGURE 6 is provided with intersecting sets of parallel ribs 26 which form a multiplicity of pockets 27; that is, the internal surface of the anode has an essentially waffle pattern or honeycomb pattern. The thickness of the anode 10 between the ribs 26 corresponds to the thickness of the anode shown in the first described structure. The purpose of the ribs 26 is to establish in the vicinity of the anode 10 zones having essentially zero electrostatic fields. As a consequence, any secondary ions (positive ions) created on the anode are in a nearly zero field and have a good chance of combining with free electrons on or near the anode.

Under some conditions of use it is possible to provide a second cathode 28 on the internal surface of the envelope 2. This cathode, like the cathode 8, is formed of fissionable material such as enriched uranium oxide. A cathode so placed is not as efficient as the cathode 8, but does add to the power output from the generator cell.

If the cathode 28 is utilized in conjunction with a generator cell having an electrostatic grid 24, a similar electrostatic grid may be interposed between the cathode 28 and the anode 10. Also, similarly, the outer surface, as well as the inner surface, of the anode 10 may have the waffle pattern formed between the ribs 26 and the pockets 27.

For the purposes of illustration, the generator shell shown in FIGURE 6 corresponds to the construction shown in FIGURE 4 in that the envelope 2 and central tube 4 are connected by end walls 18 to form a closed chamber containing a gas capable of existing in an atomic state. The construction shown in FIGURE 6 is provided with a coolant inlet 6 and coolant outlet 7 at one end, in the manner of the construction shown in FIGURE 1. This arrangement enables the opposite end of the outer shell to be closed by an end wall 29 through which conductors 14 and 15 extend.

Figure 10:
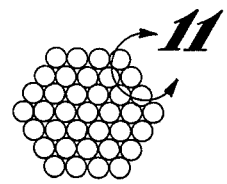
FIGURE 10 is a diagrammatical view illustrating the manner in which a multiplicity of fission electric generator cells may be arranged in a cluster.

The arrangement shown in FIGURE 6 permits grouping of a plurality of generator cells into a cluster 30, such as indicated diagrammatically in FIGURE 10. The generator cells so clustered may each have an outer shell 1, or a single outer shell may embrace the entire cluster to form a coolant chamber common to all the cells. The aggregate quantity of fissionable material contained in the cluster 30 is such that it is sufficient to sustain a chain reaction. As a consequence, the neutrons and gamma rays produced within the cluster 30 are sufficient to cause the cells to generate electrical energy without placing the cluster of cells adjacent an extraneous source of neutrons and gamma rays. By reason of the fact that the outer or second cathode 28 of each cell contributes to the total quantity of fissionable material, the cathode 28 is particularly desirable in such installations.

Figure 11:
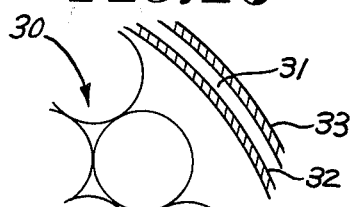
FIGURE 11 is an exaggerated, fragmentary, sectional view taken within circle 11 of FIGURE 10, showing, in addition, a Compton cell surrounding the cluster of cells.

Reference is directed to FIGURE 11. The cluster of generator cells shown in FIGURE 10 may be surrounded by a Compton cell 31 to utilize the gamma rays emitted by the cluster. The Compton cell comprises an inner shell 32 which surrounds the cell cluster and an outer shell 33 concentric with the inner one. Gamma rays emanating from the cell cluster knock electrons from the inner shell 32 to the outer one 33, to make the inner cylinder 32 the positive terminal of a cell which has the outer cylinder 33 as a negative terminal. Since gamma rays come from within the two shells 32 and 33, relatively few Compton electrons knocked out of the outer shell 33 hit the inner shell 32 to reduce current flow.

Figure 12:
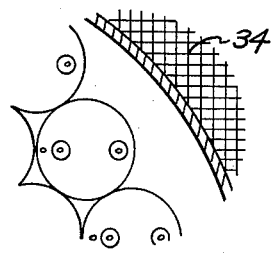
FIGURE 12 is a similar sectional view, indicating fragmentarily an electromagnetic coil surrounding the cluster.

In order to avoid individual electrostatic grids in each of the generator cells forming the cluster shown in FIGURE 10, the cluster of cells may be surrounded by an electromagnet 34, indicated fragmentarily in FIGURE 12.

While the cells shown in FIGURE 11 are cylindrical and arranged in a cluster, other shapes of cells and clusters may be used. For example, cathodes consisting of pairs of spaced sheets, for the flow of a coolant therebetween, and having enriched uranium oxide on their outside surfaces, may be placed in parallel planes, and anodes consisting of very thin sheets may be placed between the cathode sheets. Or a large number of cylinders, all concentric, may be used; every other cylinder having enriched uranium oxide on its surfaces to serve as a cathode, and the cylinders in between being very thin to act as anodes.

It should be observed that when the fission electric cells are arranged in a cluster to obtain a critical mass of fissionable material for operation without an additional reactor, a neutron moderator is placed within the cluster. This may be accomplished by utilizing heavy water ($D_2O$) as a coolant, in which case the heavy water also functions as a moderator.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A fission electric means, comprising:
   a cathode incorporating a fissionable material and disposed in a region exposed to neutron bombardment;
   thin anode means confronting said cathode and spaced sufficiently closely thereto for capturing substantially all fission particles issuing from said cathode and gamma rays, and for passing therethrough electrons having an energy value above a predetermined threshold energy value which electrons are produced by the fissioning of said cathode;
   said thin anode means further being sufficiently thin for passing therethrough electrons emitted on decay of said captured fission particles and gamma rays;
   and means for conducting electrical current from said anode and cathode.

2. A fission electric cell as set forth in claim 1, wherein: said thin anode means surrounds said thin cathode; an envelope surrounds said anode means; and a vacuum is maintained between said cathode and envelope.

3. A fission electric cell as set forth in claim 1, wherein: said thin anode means surrounds said cathode;

and a gas existing in an atomic state is maintained between said cathode and envelope.

4. A fission electric cell as set forth in claim 1, wherein: means are provided to deflect back to said cathode electrons issuing therefrom with an energy below a predetermined threshold value.

5. A fission electric cell as set forth in claim 1, wherein: electromagnetic means are provided to produce an electromagnetic field for deflecting back to said cathode electrons issuing therewith with an energy level below a predetermined threshold value.

6. A fission electric cell as set forth in claim 1, wherein: an electrostatic grid is interposed between said cathode and thin anode means and maintained at a potential to deflect back to said cathode electrons issuing therefrom with an energy level below a predetermined threshold value.

7. A fission electric cell as set forth in claim 1, wherein: an atomic energy reactor is located in proximity to said cathode to produce said region of neutron bombardment.

8. A fission electric cell as set forth in claim 1, wherein: a plurality of said cells, each formed of said cathode and thin anode means are disposed in a cluster, and the aggregate quantity of fissionable material in said cluster of cells exceeds a critical value whereby a region of neutron bombardment is established within said cluster of cells.

9. A fission electric cell as set forth in claim 1, wherein: a plurality of said cells, each formed of said cathode and thin anode means, are disposed in a cluster, and the aggregate quantity of fissionable material in said cluster of cells exceeds a critical value whereby a region of neutron bombardment is established within said cluster of cells;
and means surrounding said cluster of cells produces a magnetic field for deflecting back to each cathode electrons issuing therefrom and having an energy level below a predetermined threshold value.

10. A fission electric means, comprising:
    a tubular cathode having a coating of fissionable material;
    thin anode means spaced sufficiently close to said cathode for capturing said gamma rays and said fission particles issuing from said cathode, and passing therethrough electrons produced by the fissioning of said cathode which electrons have an energy value above a predetermined threshold value; means for effecting neutron and gamma ray bombardment of said cathode and anode, to cause emission of fission particles from said cathode;
    emission blocking means on said cathode for restricting said emissions to a predetermined obtuse angle, said anode means being dimensioned to subtend said angle;
    and means for conducting electrical current from said thin anode means and cathode.

11. A fission electric means, comprising:
    a tubular cathode having a coating of fissionable material;
    anode means for capturing said gamma rays and said fission particles, and for passing therethrough electrons having an energy value above a predetermined threshold value; means for effecting neutron and gamma ray bombardment of said cathode and anode, to cause emission of fission particles from said cathode;
    means for creating an essentially zero field adjacent the surface of said anode;
    and means for conducting electrical current from said anode means and cathode.

12. A fission electric cell, comprising:
    a cathode containing fissionable material means for emitting positively charged fission particles and electrons;
    suppression means for preventing electrons having an energy value below a predetermined threshold from leaving the vicinity of said cathode;

and thin anode means having a surface confronting said cathode and spaced sufficiently close to said cathode, for capturing a majority of said positive fission particles emitted from said cathode, and for passing therethrough the majority of the electrons produced from the fissioning of said cathode having energy value above said threshold.

13. A fission electric generator, comprising:

a cluster of fission electric cells, each of said cells having a cathode containing fissionable material, the total quantity of fissionable material in all of said fissionable cells being sufficient to sustain a chain reaction thin anode means confronting said cathode and spaced sufficiently closely thereto for capturing substantially all fission particles issuing from said cathode and gamma rays, and for passing therethrough electrons having an energy value above a predetermined threshold energy value which electrons are produced by the fissioning of said cathode;

said thin anode means further being sufficiently thin for passing therethrough electrons emitted on decay of said captured fission particles and gamma rays; and means for conducting electrical current from said anode and cathode;

a first concentric shell surrounding said cluster of fission electric cells, a second concentric shell surrounding said first concentric shell, said first concentric shell having a mass thickness sufficient to emit electrons upon bombardment by gamma rays, and said second concentric shell having a mass thickness sufficient to capture electrons emitted by said first concentric shell.

14. In a fission electric cell having a cathode containing fissionable material emitting positively charged fission particles and high energy electrons, the improvement comprising:

an anode having a thickness greater than .0005 inch and less than .030 inch, whereby the majority of said positive fission particles are captured by said anode, and the majority of said high energy electrons pass through it.

15. In a fission electric cell having a cathode emitting positive fission particles, the improvement comprising:

an anode having a surface confronting said cathode, said surface defining a plurality of pockets, each establishing a region of essentially zero electrical field said anode being sufficiently thick for capturing substantially all fission particles issuing from said cathode and gamma rays, and for passing therethrough electrons having an energy value above a predetermined threshold energy value which electrons are produced by the fissioning of said cathode.

References Cited by the Examiner

UNITED STATES PATENTS

| | | | |
|---|---|---|---|
| 2,527,945 | 10/1950 | Linder | 310—3 |
| 2,552,050 | 5/1951 | Linder | 310—3 |
| 2,633,542 | 3/1953 | Coleman | 310—3 |
| 2,728,867 | 12/1955 | Wilson | 310—3 |
| 2,863,074 | 12/1958 | Johnstone | 310—4 |
| 2,915,652 | 12/1959 | Hotsopoulos et al. | 310—4 |
| 3,079,527 | 2/1963 | Opfermann | 310—4 X |
| 3,093,567 | 6/1963 | Jablouski et al. | 176—52 |

FOREIGN PATENTS

| | | |
|---|---|---|
| 1,234,539 | 5/1960 | France. |
| 797,872 | 7/1958 | Great Britain. |

OTHER REFERENCES

G. Safanov: ASTIA, AD144 303 Direct Power Conversion, part II, The Fission Reactor, Dec. 12, 1957 (received Patent Office Aug. 4, 1959), pp. 1–15. Copy in 310–3.

A. Shock: ASTIA, AD216,812 A Direct Nuclear Electrogenerator, June 15, 1959 (received in Patent Office Library July 31, 1962), pp. 1–23. Copy in 310–3.

REUBEN EPSTEIN, *Primary Examiner.*

CARL D. QUARFORTH, *Examiner.*